No. 720,653. PATENTED FEB. 17, 1903.
V. G. APPLE.
ELECTRIC BATTERY.
APPLICATION FILED JUNE 3, 1901.
NO MODEL.
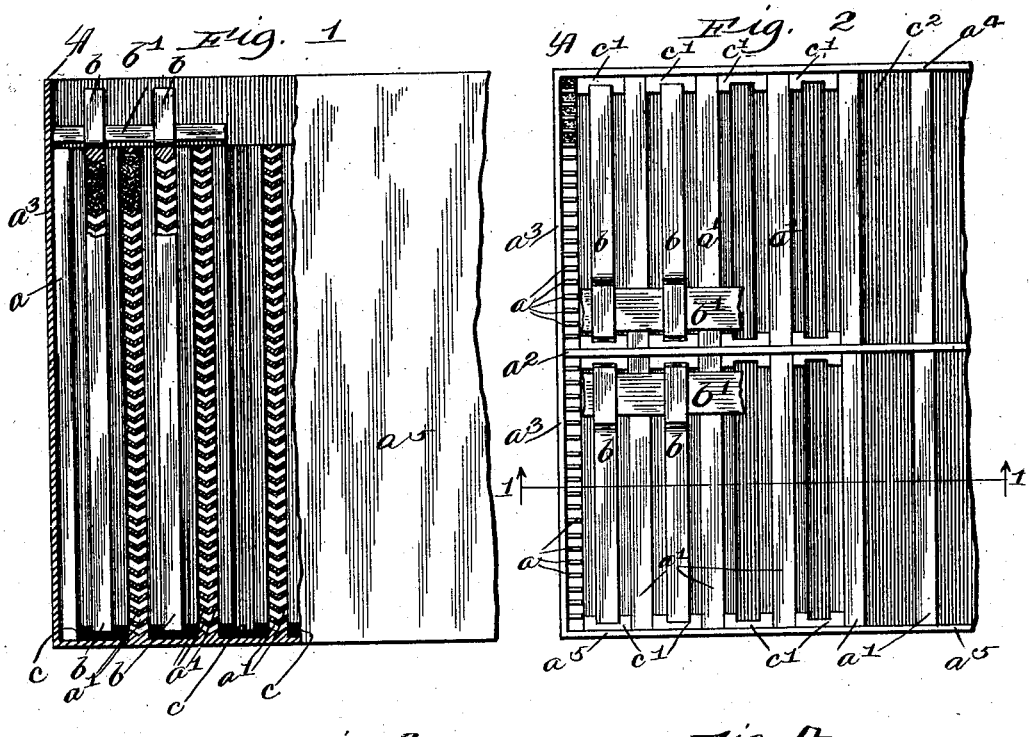
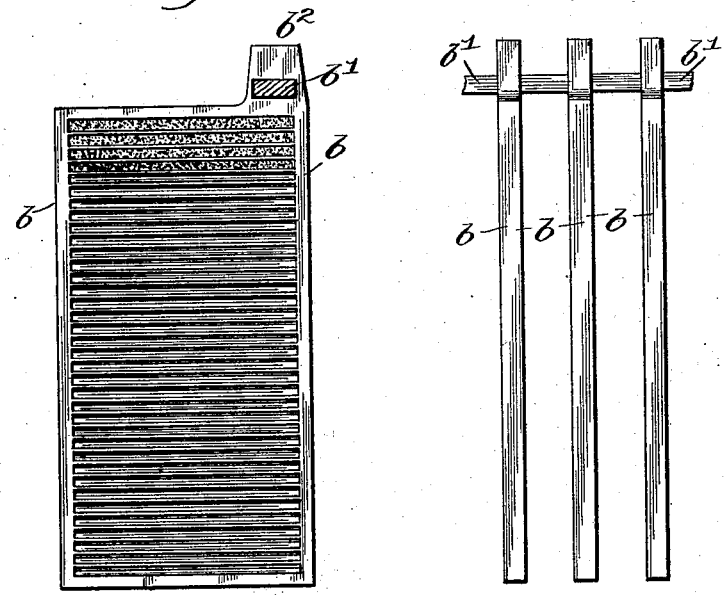
Witnesses:
Ray White
Harry C. White
Inventor:
Vincent G. Apple
By Jones Bain Attorney

UNITED STATES PATENT OFFICE.

VINCENT G. APPLE, OF DAYTON, OHIO.

ELECTRIC BATTERY.

SPECIFICATION forming part of Letters Patent No. 720,653, dated February 17, 1903.

Application filed June 3, 1901. Serial No. 63,012. (No model.)

*To all whom it may concern:*

Be it known that I, VINCENT G. APPLE, of Dayton, in the county of Montgomery and State of Ohio, have invented certain new and useful Improvements in Electric Batteries; and I hereby declare that the following is a full, clear, and exact description thereof, reference being had to the accompanying drawings, which form part of this specification.

My invention relates to improvements in electric batteries.

The object of my invention is to provide a storage battery in which the containing-cell is constructed integrally with one set of the elements or plates of which the battery is composed—that is to say, that either the negative or the positive plates are made an integral part of the containing-cell.

Another object of my invention is to provide a corresponding set of elements or plates cast, forced, or otherwise formed together in one integral construction and when completed are adapted to alternate with the plates that are made integral with the said cell. The effect of this construction is to economize space and weight and to save the expense of providing the ordinary delicate insulating containing-cell.

In the drawings, Figure 1 is a broken-away vertical section of one of my cells, taken on lines 1 1 of Fig. 2. Fig. 2 is a plan view of a fragment of the same. Fig. 3 is a side view of one of the series of plates adapted to be inserted in the said cell. Fig. 4 is a broken-away elevation showing three of the insertable elements as they appear when joined together.

In all of the views the same letters of reference indicate similar parts.

A is a containing-cell made, preferably, of lead or an alloy of lead or of any material that can be used in the construction of grids for storage batteries. $a$ shows the side of the said cell ribbed vertically. Between the ribs the active material is to be confined. These ribs may be placed longitudinally in position and the active material retained thereby. $a^2$ is a metallic partition made, preferably, of the same material of which the walls of the cell A are composed. $a^3$ is the end wall of both cells. $a^4$ and $a^5$ are the side walls of the said cells.

$b$ represents a series of inseparable electrodes or plates joined by the connecting-bar $b'$, cast or forced integrally therewith. $b^2$ represents projections from the said plates, any one of which may form the terminal to which contacts may be made, or this projection may be limited to any one of the plates for the purpose of affording a general terminal for the said group of plates. $c$ is a series of horizontal rubber strips which are laid in the bottom of the said compartments between the stationary electrodes thereof and which afford a means for supporting the removable plates $b$. $b'$ represents similar vertically-placed strips of hard rubber or other insulating material having grooves into which the edges of the plates $b$ are adapted to be contained. By means of these insulating-strips the plate $b$ is supported at the bottom and sides midway between the stationary plates that are made integral with the cell. In Fig. 2, $c^2$ is a space in which one of these grooved insulators has been left out to show the space between the plates.

The plates $a'$ are made integral with the containing-case and join the side walls thereof. The bars of which a plate is composed consist of a series of parallel angled strips, extending from side to side and placed equal distances apart. Between these bars the active material is to be filled in. The exact construction of the plate, however, is not important to this invention. The bars may be run in a vertical or oblique direction, and the plates instead of being composed of bars may be made like a grid to contain a series of perforations or other indentations. It is important, however, that the said plates shall be made metallically integral with the containing-case, and it is essential that the space between the plates shall not be liquid-tight.

Batteries have been made by me in accordance with the drawings of this application; but the specific method and means for making the said batteries will form subject-matter for other applications for Letters Patent.

In Fig. 2 I have shown two cells contained in a single case, the entire structure being made of a metal adapted to be used for the elements or plates of a storage battery. One of the sets of removable plates, which are all of a like polarity, may form one terminal of this double-unit battery. The corresponding cell will be of opposite polarity, while the remaining cell will be of the opposite polarity from that of the first-mentioned cell and its set of removable plates will be of opposite polarity from that of the first-mentioned set of removable plates. In this manner the difference of potential between the said movable plates will be two times that of a single cell.

The containing-case A may be made into two cells, such as I have just described, or into one cell. In the event that two cells are provided in a single structure of the said retaining-case the electromotive force of the unit thus formed will be practically four volts. In the event that a single cell is used the greatest potential difference will be evidenced between the removable plates and the containing-case, which will be practically two volts or thereabout, as in the ordinary lead battery when constructed as described.

A great advantage resulting from the construction which I have just described is due to the fact that the series of stationary plates and the series of removable plates are each formed into an integral homogeneous whole, the removable plates being cast or otherwise formed together by means of bar $c'$ when the said plates are produced, the stationary plates $a'$ being cast or otherwise formed integral with the containing-cell at the time when the said cell is produced, and as a result of this construction there are no artificial joints in the entire battery.

I have shown several of the plates partly filled with active material and have left it out of the other parts and plates for the purpose of showing the construction thereof more plainly.

Having described my invention, what I claim as new, and desire to secure by Letters Patent of the United States, is—

1. In an electric battery, the combination with a conducting containing-case, of a vertical series of lateral bars joined to the sides of said case constituting a supporting structure for active material, a series of said structures in said case, and a series of removable plates or grids in alternating position with said bar structures, substantially as set forth.

2. In an electric battery the combination with a conducting containing-case, of a vertical series of lateral bars joined to the sides of said case constituting a supporting structure for active material, a series of said structures in said case, a series of removable plates or grids in alternating position with said bar structures, and supports on the inner walls of said case for carrying active material, substantially as set forth.

3. In an electric battery the combination with a conducting containing-case, of a vertical series of lateral bars joined to the sides of said case constituting a supporting structure for active material, dividing said case into two compartments, and a removable plate in each compartment, substantially as set forth.

4. An electric battery comprising, a conducting, containing-case provided with two compartments, a group of supporting-plates, or grids, in each compartment made integral therewith, the groups in the respective compartments being of opposite polarity, a group of removable plates, or grids, of like polarity in each compartment in alternating position with the fixed plates thereof and of opposite polarity thereto, the said two groups of removable plates being of opposite polarity with respect to each other, substantially as set forth.

5. In an electric battery the combination with a conducting containing-case, of a vertical series of lateral bars joined to the sides of said case constituting a supporting structure for active material, a series of removable intervening plates, or grids, and insulators for holding said removable plates in position, substantially as set forth.

In testimony that I claim the foregoing as my own I affix my signature in presence of two witnesses.

VINCENT G. APPLE.

In presence of—
 L. A. ARNOLD,
 C. E. TAYLOR.